(12) United States Patent
Altenschmidt

(10) Patent No.: US 7,404,390 B2
(45) Date of Patent: Jul. 29, 2008

(54) METHOD FOR OPERATING AN EXTERNALLY IGNITED INTERNAL COMBUSTION ENGINE

(75) Inventor: Frank Altenschmidt, Biberach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/556,055

(22) PCT Filed: Mar. 23, 2004

(86) PCT No.: PCT/EP2004/003046

§ 371 (c)(1),
(2), (4) Date: Nov. 21, 2006

(87) PCT Pub. No.: WO2004/099598

PCT Pub. Date: Nov. 18, 2004

(65) Prior Publication Data

US 2007/0251497 A1    Nov. 1, 2007

(30) Foreign Application Priority Data

May 9, 2003  (DE) ............................... 103 20 848

(51) Int. Cl.
*F02B 3/02* (2006.01)
*F02B 3/00* (2006.01)
(52) U.S. Cl. .................. 123/299; 123/406.47
(58) Field of Classification Search .......... 123/295, 123/299, 300, 301, 304, 305, 430, 406.47
See application file for complete search history.

(56) References Cited

U.S. PATENT DOCUMENTS

| | | | | | |
|---|---|---|---|---|---|
| 4,356,807 | A | * | 11/1982 | Tokura et al. ................ | 123/606 |
| 4,481,921 | A | * | 11/1984 | Tsukahara et al. ........... | 123/304 |
| 4,621,599 | A | * | 11/1986 | Igashira et al. ............... | 123/300 |
| 5,740,776 | A | | 4/1998 | Enderle et al. | |
| 6,032,637 | A | * | 3/2000 | Mamiya et al. .............. | 123/295 |
| 6,067,954 | A | * | 5/2000 | Kudou et al. ................. | 123/299 |
| 6,467,453 | B1 | | 10/2002 | Ernst et al. | |
| 6,516,773 | B2 | * | 2/2003 | Dutart et al. ................. | 123/299 |
| 6,557,532 | B1 | * | 5/2003 | Nakayama et al. .......... | 123/490 |

(Continued)

FOREIGN PATENT DOCUMENTS

DE      196 02 065 A1      7/1997

(Continued)

OTHER PUBLICATIONS

IPER including English translation of pertinent portion (Eleven (11) pages), Aug. 8, 2005.

(Continued)

*Primary Examiner*—Mahmoud Gimie
(74) *Attorney, Agent, or Firm*—Crowell & Moring LLP

(57) ABSTRACT

In a method for forming a fuel/air mixture of a directly injecting internal combustion engine with a spark ignition, the fuel injection is configured in a stratified charge operating mode of the internal combustion engine in such a way that a first, a second and optionally a third part amount are introduced into the combustion chamber during the compression stroke of the internal combustion engine. The injection of the final part amount is ended at a crank angle which lies in a range between −2° CA and 20° CA before the ignition time.

16 Claims, 1 Drawing Sheet

U.S. PATENT DOCUMENTS

| | | | |
|---|---|---|---|
| 6,691,671 B2* | 2/2004 | Duffy et al. | 123/299 |
| 6,705,277 B1* | 3/2004 | McGee | 123/299 |
| 7,073,479 B2* | 7/2006 | Kohler et al. | 123/295 |
| 7,140,345 B2* | 11/2006 | Gioannini et al. | 123/299 |
| 7,165,527 B2* | 1/2007 | Okude et al. | 123/299 |
| 7,222,602 B2* | 5/2007 | Fukasawa | 123/299 |
| 2003/0089333 A1* | 5/2003 | Duffy et al. | 123/299 |
| 2004/0040534 A1 | 3/2004 | Herden | |
| 2004/0103874 A1* | 6/2004 | Takahashi | 123/299 |
| 2006/0016424 A1* | 1/2006 | Gioannini et al. | 123/299 |
| 2006/0124104 A1* | 6/2006 | Altenschmidt | 123/299 |

FOREIGN PATENT DOCUMENTS

| | | |
|---|---|---|
| DE | 198 57 785 A1 | 6/2000 |
| DE | 198 57 785 C2 | 12/2000 |
| DE | 101 05 755 A1 | 8/2002 |
| JP | 11-82030 | 3/1999 |
| JP | 2002-115593 | 4/2002 |
| JP | 2002-161790 | 6/2002 |

OTHER PUBLICATIONS

PCT/IB/237 with English translation thereof (Eight (8) pages), Aug. 8, 2005.

International Search Report, Jul. 22, 2004.

* cited by examiner

METHOD FOR OPERATING AN EXTERNALLY IGNITED INTERNAL COMBUSTION ENGINE

BACKGROUND AND SUMMARY OF THE INVENTION

This invention relates to a method for operating a spark-ignition internal combustion engine with direct injection, in which the fuel is injected into a combustion chamber in a plurality of part amounts, predominantly in the compression stroke.

When spark-ignition internal combustion engines with direct injection operate, a series of measures are performed to improve the formation of mixture, so that reliable ignition is brought about in stratified charge operating modes of the internal combustion engines. Attempts are often made to influence the mixture formation in a targeted fashion by clocking the fuel injection.

German Patent DE 198 577 85 C2 discloses a method for mixture formation in a combustion chamber of an internal combustion engine in which a three-stage fuel injection is performed without interrupting the injection and in which a main amount of fuel is connected to an ignition amount of fuel via a supplementary amount of fuel.

In the known methods, an optimum combustion method is often not achieved in modern spark-ignition internal combustion engines with direct injection because it is not possible to ensure an operating behavior of the internal combustion engine without misfires.

The object of the invention is, in contrast with the above, to configure the injection process in such a way that an ignitable mixture cloud is formed in the vicinity of an ignition source in order to bring about an improved operating behavior without misfires.

This object is achieved according to the invention.

In a first method according to the invention, in a stratified charge operating mode of the internal combustion engine, fuel injection is configured in such a way that a first, a second, and, optionally, a third part amount are introduced into the combustion chamber in a compression stroke of the internal combustion engine, and the ignition of the fuel/air mixture which is formed is performed after the part amount which is introduced last has ended. The injection of the final part amount is started at a crank angle position of −2° CA to 20° CA before the ignition. That is to say, the ignition time can be performed 2° CA before the start of the injection or 2° CA before the injection end of the final part amount until 20° CA after the start of the injection of the final part amount. The injection of the final part amount is preferably started at a crank angle position of from 5° CA to 20° CA before the ignition. In the context of the present invention, the final part amount is either the second part amount, if the overall fuel amount is introduced in two part amounts, or the third part amount, if the overall fuel amount is introduced in three part amounts. It is conceivable for the first part amount to be performed in the intake stroke preferably between 200° CA and 300° CA before a top dead center. As a result of the second and optionally third part amounts, an ignitable fuel/air cloud is subsequently formed near the spark plug before the ignition, by way of which fuel/air cloud the ignition of the complete mixture can be brought about reliably. The position and properties of the ignitable mixture cloud are influenced positively by the injection time of the final part amount, as a result of which a stratified charge operating mode can be configured in an optimum way in predominantly all load ranges. As a result, it is possible to minimize the undesired misfires further.

In one refinement of the invention, a period between the start of injection of the second part amount and the end of injection of the first part amount is approximately 0.1 to 1 ms. Here, a period is defined between the injection end of the second part amount and the ignition time or between the injection end of the third part amount and the ignition time, with the result that the positions of the first and the second or the third injections are defined by a time interval from the start of injection or from the end of injection of the second or the third injection.

According to a further refinement of the invention, a period between the start of injection of the third part amount and the end of injection of the second part amount is approximately 0.15 to 1 ms. In particular in the case of high loads, for example with an effective average pressure $P_{me}$ greater than 3 bar, it is possible for the mass of fuel of the first part amount to be between 10% and 70% of the entire mass of fuel.

In a further refinement of the invention, an injection nozzle which opens to the outside is used, so that the fuel from the fuel injection nozzle is injected into the combustion chamber in the form of a hollow cone. Here, an ignitable mixture cloud is provided in approximately all of the rotational speed ranges and load ranges, with the result that misfires are prevented from occurring.

Further features and feature combinations will emerge from the description. Specific exemplary embodiments of the invention are illustrated in a simplified form in the drawings and are explained in more detail in the following description.

DETAILED DESCRIPTION OF THE INVENTION

An internal combustion engine with direct fuel injection has at least one cylinder in which a combustion chamber is formed between a piston which is held in the cylinder in a longitudinally displaceable fashion and a cylinder head. The longitudinal movement of the piston extends between a top dead center OT and a bottom dead center UT. The internal combustion engine operates according to the 4-stroke principle, with the method according to the invention also being suitable for spark-ignition 2-stroke internal combustion engines with direct injection.

In the first intake stroke of the 4-stroke internal combustion engine, combustion air is fed to the combustion chamber through an inlet duct, with the piston moving in a downward movement as far as a gas-exchange bottom dead center GUT. In a further compression stroke, the piston moves in an upward movement from GUT as far as an ignition top dead center ZOT at which the fuel is injected in a stratified charge operating mode of the internal combustion engine during the compression stroke. In the vicinity of the top dead center ZOT, the fuel/air mixture is ignited by means of a spark plug, with the piston expanding in a downward movement as far as a bottom dead center UT (expansion stroke). In the last stroke, the piston moves in an upward movement as far as the gas-exchange top dead center GOT and pushes the gases out of the combustion chamber.

The internal combustion engine according to the present exemplary embodiment is preferably operated in the stratified charge operating mode when there is a low load to medium-sized load L and/or at low to medium rotational speeds N, and in the homogeneous operating mode in the upper load range or at full load. Alternatively, the stratified charge operating mode can be expanded to other load ranges, for example to the upper load range or full load.

Figure 1:
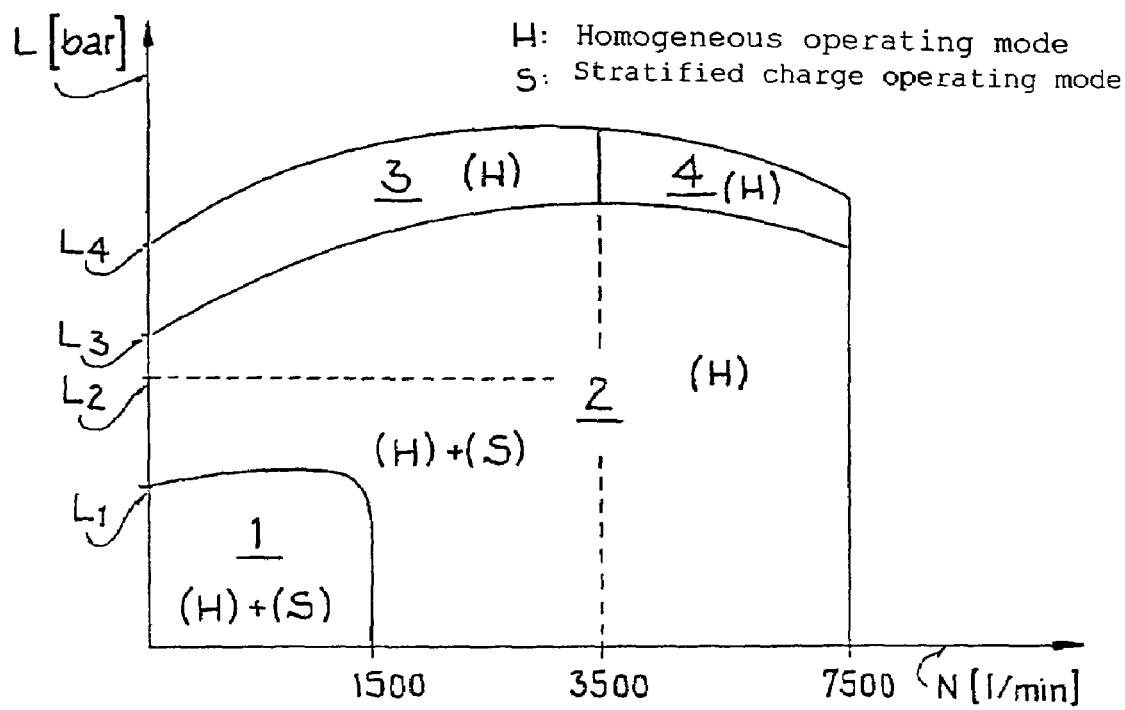
FIG. 1 is a schematic characteristic field diagram of a direct-injecting internal combustion engine.

According to FIG. 1, the multiple injection is varied as a function of the load in such a way that in some load ranges a dual or triple injection takes place, with a single fuel injection being able to take place as a function of the load. In the characteristic field diagram according to FIG. 1, a single or a dual fuel injection takes place in the load range 1 since in the range the engine is operating with a very low load L at a low rotational speed N. In the load range 2, a triple fuel injection is preferably performed, with a single or dual fuel injection being able to take place at a number of load points. In the load region 3, a single, dual, or triple fuel injection is preferably performed, with a single or a dual fuel injection taking place in the load range 4. Depending on the number of injections performed and the injection times of the individual part amounts, a homogeneous operating mode H or a stratified charge operating mode S takes place. For example, a homogeneous operating mode H or a stratified charge operating mode S can take place in the load range 1 with a rotational speed up to 1500 and a load $L_1$ with an effective average pressure up to one bar. A homogeneous operating mode H or a stratified charge operating mode S can also take place up to a load $L_2$ with an effective average pressure between seven and eight bar. Further examples are shown in FIG. 1, with the load $L_3$ corresponding to an effective average pressure of approximately eight to nine bar, and the load $L_4$ corresponding to an effective average pressure of 13 bar in internal combustion engines without supercharging and to an effective average pressure of approximately 21 bar in internal combustion engines with supercharging.

The method according to the invention is suitable, in particular, for jet-controlled combustion methods, in which the injection of the total fuel amount is carried out in the stratified charge operating mode in the compression stroke, for example in a crank angle range between 120° CA and 10° CA before ZOT. The complete fuel injection preferably takes place in three part amounts during one working cycle. It is conceivable, for example at high loads with an effective average pressure between four and eight bar, for the first part amount to be performed in the intake stroke, preferably between 200° CA and 320° CA before ZOT.

Figure 2:
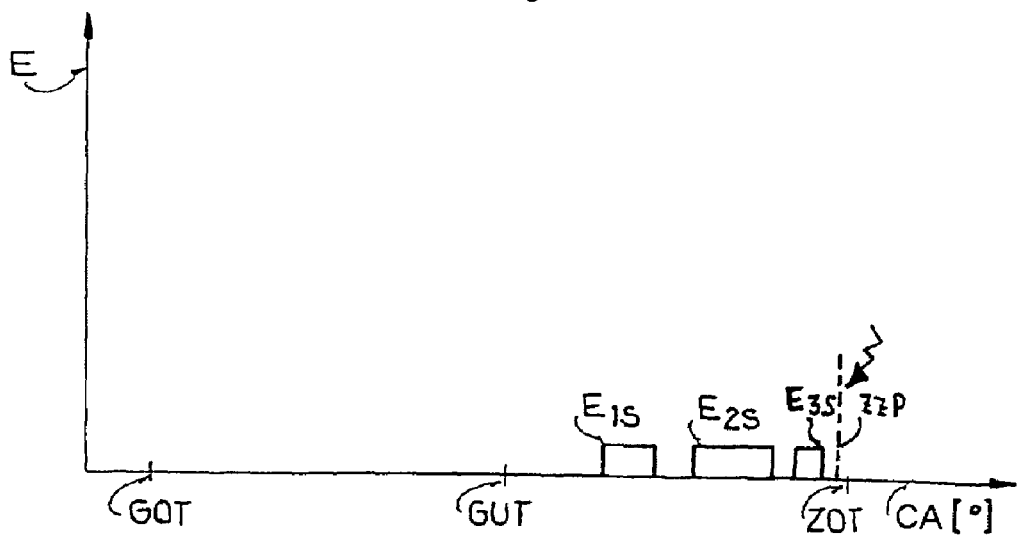
FIG. 2 is a schematic diagram of the injection profile of the internal combustion engine of FIG. 1 in the stratified charge operating mode plotted against the crank angle.

The time profile of the fuel injections E in the stratified charge operating mode is illustrated in FIG. 2, with the fuel injections being configured in such a way that a first, a second, and a third part amount $E_{1S}$, $E_{2S}$, $E_{3S}$ are introduced in the compression stroke of the internal combustion engine. The first part amount $E_{1S}$ can alternatively be performed at high loads, in particular with an effective average pressure $P_{me}$ between 4 bar and 8 bar, preferably in the intake stroke between 200° CA and 320° CA before ZOT. In the stratified charge operating mode of the internal combustion engine the ignition takes place after the final part amount. This can be the second or the third part amount, depending on the operating point. The injection of the final part amount $E_{3S}$ is ended as a function of the load in a crank angle range which lies between 20° CA and −2° CA before the ignition time ZZP.

In the context of the present invention, the ignition time ZZP can be performed 2° CA before the beginning of the injection or 2° CA before the end of the injection of the final part amount to 20° CA after the start of the injection of the final part amount. The ignition preferably takes place 5° CA to 20° CA after the start of the injection of the final part amount, the ignition time lying within the injection period of the final part amount if the injection period of the final part amount is more than 5° CA. In the context of the present invention, the final part amount is either the second part amount if the overall fuel amount is introduced in two part amounts, or the third part amount if the overall fuel amount is introduced in three part amounts. The third injection $E_{3S}$ advantageously takes place shortly after the end of the second injection $E_{2S}$.

In this exemplary embodiment, a jet-controlled combustion method is carried out, in which an injection nozzle which opens toward the outside is preferably used. The injection strategy described above serves in particular to stabilize the jet-controlled combustion method in the stratified charge operating mode and permits a larger amount of exhaust gas recirculation in the stratified charge operating mode. This reduces the NOx formation.

In the jet-controlled combustion method, a fuel hollow cone with an angle between 70° and 100° is introduced into the combustion chamber by means of the injection nozzle, so that the fuel hollow cone impinges on combustion air which is compressed in the combustion chamber in the stratified charge operating mode. A toroidal eddy is thus formed in the outer region or at the edge of the injected fuel hollow cone, as a result of which an ignitable fuel/air mixture is made available in the vicinity of the electrodes of the spark plug. The spark plug is arranged in such a way here that the electrodes of the spark plug project into the edge eddy which is obtained without them being significantly wetted during the fuel injection, i.e. when there is light or slight wetting of the electrodes of the spark plug the majority of the fuel should be vaporized again at the electrodes by the ignition time.

With the multiple injection described, the operating behavior of the internal combustion engine can be improved. The consumption and formation of emissions can thus be optimized. These advantages are obtained in particular when a piezo-injector is used in which short injection times, for example less than 0.25 ms, can be achieved. As a result, very small fuel amounts can be introduced into the combustion chamber in a part amount if the fuel injection preferably takes place with high injection pressures between 170 and 220 bar or between 150 and 300 bar. As a result, multiple injections are made possible during a working cycle particularly when a spark-ignition internal combustion engine with direct injection starts. In the stratified charge operating mode, the fuel is preferably injected into the combustion chamber with a combustion chamber counter-pressure of approximately 6 bar to 18 bar, preferably between 9 bar and 13 bar.

In particular, the method according to the invention is suitable for the jet-controlled combustion method, in which it is necessary for a satisfactorily conditioned mixture to be available in the vicinity of the spark plug within a very short time. The position and properties of the ignitable mixture cloud are influenced positively, as a result of which reliable ignition takes place in all the load ranges. In particular, as a result of the method according to the invention, what is referred to as the jet-controlled combustion method is stabilized, as a result of which a higher level of tolerance of EGR can be achieved. This leads to a further reduction in the NOx emissions and the particle emissions. The stratified charge operating mode can more easily be extended to all the rotational speed ranges and load ranges as a result.

The invention claimed is:

1. A method for forming an ignitable fuel/air mixture in a combustion chamber of a spark-ignition internal combustion engine with direct injection, comprising:

feeding combustion air to the combustion chamber via an inlet duct, injecting fuel into the combustion chamber by a fuel injector arranged in the combustion chamber, the fuel injector having an injection nozzle which opens to the outside, so that the fuel from the fuel injection nozzle is injected into the combustion chamber in the form of a hollow cone, and igniting a fuel/air mixture which is formed by a spark plug arranged in the combustion chamber, wherein fuel injection takes place in a plurality of part amounts, wherein, in a stratified charge operating mode of the internal combustion engine, the fuel injection is configured so that first, second, and third part amounts are introduced into the combustion chamber in a compression stroke of the internal combustion engine, and wherein ignition is performed based on at least one of a start of the injection of the third part amount and an end of the injection of the third part amount and in a range from 2° CA before the start of the injection of the third part amount to 20° CA after the start of the injection of the third part amount.

2. The method as claimed in claim 1, wherein a period between a start of injection of the second part amount and an end of injection of the first part amount is approximately 0.1 to 1 ms.

3. The method as claimed in claim 1, wherein a period between the start of injection of the third part amount and an end of injection of the second part amount is approximately 0.15 to 1 ms.

4. The method as claimed in claim 1, wherein a toroidal fuel/air mixture eddy is formed at the end of the hollow cone in such a way that electrodes of the spark plug which are arranged outside a generated surface of the hollow cone contact the toroidal fuel/air mixture eddy.

5. The method as claimed in claim 1, wherein a control device of the fuel injection nozzle is driven piezoelectrically.

6. The method as claimed in claim 2, wherein a period between the start of injection of the third part amount and an end of injection of the second part amount is approximately 0.15 to 1 ms.

7. The method as claimed in claim 2, wherein a toroidal fuel/air mixture eddy is formed at the end of the hollow cone in such a way that electrodes of the spark plug which are arranged outside a generated surface of the hollow cone contact the toroidal fuel/air mixture eddy.

8. The method as claimed in claim 3, wherein a toroidal fuel/air mixture eddy is formed at the end of the hollow cone in such a way that electrodes of the spark plug which are arranged outside a generated surface of the hollow cone contact the toroidal fuel/air mixture eddy.

9. The method as claimed in claim 6, wherein a toroidal fuel/air mixture eddy is formed at the end of the hollow cone in such a way that electrodes of the spark plug which are arranged outside a generated surface of the hollow cone contact the toroidal fuel/air mixture eddy.

10. The method as claimed in claim 2, wherein a control device of the fuel injection nozzle is driven piezoelectrically.

11. The method as claimed in claim 3, wherein a control device of the fuel injection nozzle is driven piezoelectrically.

12. The method as claimed in claim 4, wherein a control device of the fuel injection nozzle is driven piezoelectrically.

13. The method as claimed in claim 6, wherein a control device of the fuel injection nozzle is driven piezoelectrically.

14. The method as claimed in claim 7, wherein a control device of the fuel injection nozzle is driven piezoelectrically.

15. The method as claimed in claim 8, wherein a control device of the fuel injection nozzle is driven piezoelectrically.

16. The method as claimed in claim 9, wherein a control device of the fuel injection nozzle is driven piezoelectrically.

* * * * *